United States Patent

[11] 3,551,609

[72] Inventors Cecil Winthrop Libby
Thousand Oaks;
Robert H. Sand, Diamond Bar, Calif.
[21] Appl. No. 797,769
[22] Filed Feb. 10, 1969
[45] Patented Dec. 29, 1970
[73] Assignee Burroughs Corporation
Detroit, Mich.
a corporation of Michigan

[54] MAGNETIC RECORDING HEAD WITH INTERLOCKING "V" BARS
12 Claims, 6 Drawing Figs.

[52] U.S. Cl. .......... 179/100.2, 340/174.1; 346/74
[51] Int. Cl. .......... G11b 5/26
[50] Field of Search .......... 179/100.2C; 340/174.1F; 346/74MC

[56] References Cited

UNITED STATES PATENTS 3,249,928 5/1966 Curtis et al. .......... 340/174.1
3,284,579 11/1966 Dirks .......... 179/100.2

*Primary Examiner*—Stanley M. Urynowicz, Jr.
*Assistant Examiner*—Raymond F. Cardillo, Jr.
*Attorney*—Christie, Parker & Hale

ABSTRACT: A dual-gap magnetic recording transducer having a series of parallel indentations defining record and reproduce portions of the transducer is provided with interlocking inserts secured in the indentations. Overlapping end portions of outside elements mate with corresponding end portions of an interior element to lock the interior element in position. The pair of outside elements are secured to the body portion of the transducer by suitable fastening means.

MAGNETIC RECORDING HEAD WITH INTERLOCKING "V" BARS

BACKGROUND OF THE INVENTION

This invention relates to magnetic transducers and in particular to a dual-gap magnetic transducer used for write-check recording on a magnetic carrier.

The present invention is directed to a dual-gap magnetic transducer similar to the type described in U.S. Pat. No. 3,249,928, assigned to the same assignee as the present invention.

In a dual-gap magnetic head such as shown in U.S. Pat. 3,249,928, an element in the form of a V-shaped bar is located in a mating aperture or groove cut into the surface of the head which is to be disposed adjacent a magnetic carrier. Such a bar is normally constructed of a nonmagnetic conductive material and is provided for preventing interaction between the magnetic carrier (e.g. tape) and the shielding elements which provide electromagnetic and electrostatic shielding for the electromagnetic transducer structures located internally of the head structure.

In prior art magnetic transducer heads the V-shaped bar is secured in position in its mating groove by the use of an adhesive applied to the mating surfaces of the bar and groove. Various adhesive materials have been found satisfactory in this application, particularly those of the epoxy type. It has been found, however, that in the course of subsequent handling during production of transducer heads of this type, for example, final lapping and polishing operations which are performed on the head and particularly the transducing surface, that normal handling tends to loosen and dislodge the bar. In addition, in some head structures the transducing portion is raised or elevated relative to the remaining body portion of the head assembly with a majority of the material in the elevated portion being comprised of a potting material in which the operating elements of the head are sealed. In the course of using heads of this type it has been found that the potting material is subject to wear tending to expose the operating elements and to alter the magnetic characteristics of the head.

SUMMARY OF THE INVENTION

The present invention provides an improved dual-gap magnetic transducer head. The head comprises a block of material having a first longitudinal surface on one side of the block and a second longitudinal surface on the same side of the block laterally displaced from the first surface. A transducer portion is located on the block between the first and second surfaces having an elevated surface which is to be positioned in operative relation with a magnetic medium. First, second and third adjacent apertures extending across the elevated surfaces are provided with first, second and third elements having intermediate portions fitting in the said first, second and third apertures, respectively, with end portions of each of said elements resting on the first and second surfaces of the block of material. The end portion portions of the second element are provided with side surfaces that taper inwardly from the first and second longitudinal surfaces. The end portions of the first and third elements located on opposite sides of the second element have side surfaces adjacent the side surfaces of the second element provided with a mating taper to engage the side surfaces of the second element end portions. Means for physically connecting the first and third elements to the block are provided.

To provide additional alterations to the shape of the magnetic core and its magnetic characteristics, two or more grooves have been cut across the contoured surface of the head extending in a direction transverse to the direction of movement of the magnetic tape relative to the head. Where three grooves are provided, the write and read transducing elements of the head are located on opposite sides of the middle groove and extend into the apexes defined by the middle groove in cooperation with the two grooves located on either side thereof. Elements or bars of the same nonmagnetic, conductive material from which the body portion of the head is made are seated in and bonded to the surfaces of the grooves by means of an adhesive. However, as indicated above, it is a relatively easy matter for bars which are merely adhesively bonded to be dislodged from the grooves in the course of the manufacture of the dual-gap heads.

To combat this problem, the dual-gap head of the present invention has been provided. In it the three bars of the prior art head are now provided with V-shaped portions intermediate end portions which bracket the elevated and contoured transducer portion of the recording head and which are given a predetermined shape such that the end portion side surfaces of the two outside V bars rest over and seat upon specially shaped end portion side surfaces of the middle V bar. As before, all of the V bars are secured in position by means of an adhesive bond, but the mechanical integrity of the assembly is assured by physically securing the outside V bars to the body portion of the head structure by means extending through the outside bar end portions and into the body portion of the head. In one embodiment machine screws pass through the portions of the outside V bars and into receiving locations such as tapped holes in shoulders or longitudinal surfaces of the body portion of the transducer assembly on which the V bar end portions rest. Mechanically securing the outside V bars, plus the mating relation of the adjacent side surfaces of the end portions of these two bars with the side surfaces of the end portions of the middle bar provide the means whereby the middle V bar is locked securely into place on the magnetic recording head.

In addition to the interlocking middle bar construction, the present invention also contemplates providing a structure wherein the middle bar is mechanically secured to the body of the transducer and the end portions of the bars as well as the transducing portion configured such that the middle bar interlocks with the two outside bars. In a third embodiment the three bars are attached to form an integral structure which is in turn mechanically secured to the body of the transducer structure.

DESCRIPTION OF THE DRAWINGS

The present invention will be better understood by reference to the following figures wherein.

DESCRIPTION OF A SPECIFIC EMBODIMENT

Figures 1, 2, 3, 4, 5, 6:
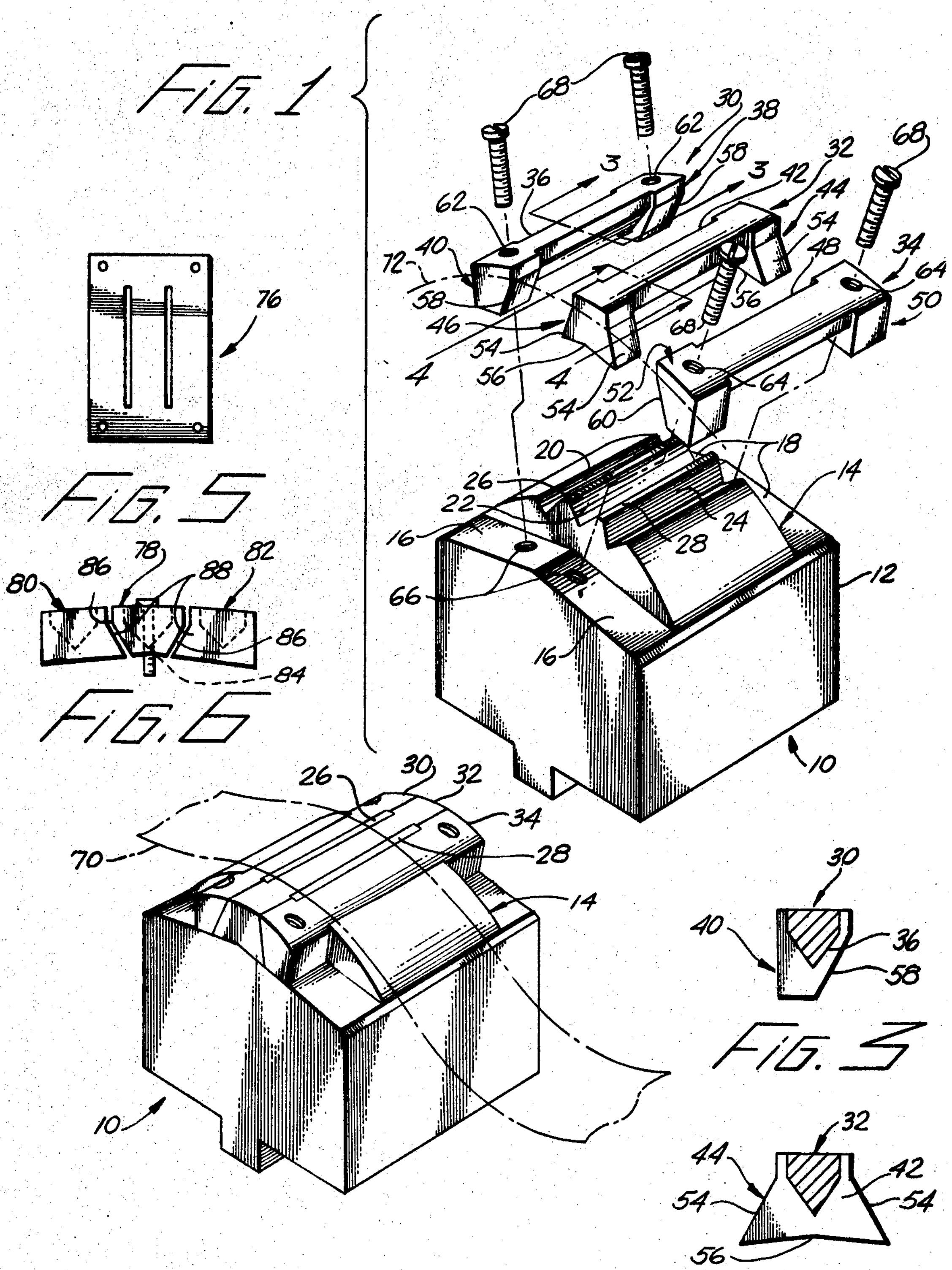
FIG. 1 is an exploded perspective view of a magnetic transducer structure utilizing the inter locking V bar construction of the present invention.
FIG. 2 is a perspective view of the assembled transducer structure of FIG. 1.
FIG. 3 is a view taken along lines 3–3 of FIG. 1.
FIG. 4 is a view taken of along lines 4–4 of FIG. 1.
FIG. 5 is a plan view of an alternate embodiment embodiment of the V bar construction of the present invention.
FIG. 6 is a sectional view of another alternate embodiment of the V bar construction of the present invention.

In FIG. 1 is shown an exploded view of a magnetic transducer structure 10. As shown therein, structure 10 comprises a body portion 12 and a transducer portion 14 disposed on one side of body portion 12. Body portion 12 is preferably fabricated of a material such as sintered stainless steel, brass or aluminum. As shown in FIG. 1, transducer portion 14 has a shorter transverse dimension than body portion 12 leaving longitudinal shoulder surfaces 16 and 18 exposed at either side of the raised transducer portion 14 and extending laterally thereof. Cut into the surface of transducing portion 14 are three transverse apertures or grooves 20, 22 and 24. The three grooves act to define two ridges 26 and 28 in which are located one or more magnetic recording and reproducing transducers (not shown).

Shown above structure 10 are three elements or bars 30, 32 and 34 of the same material as body portion 12, each of the three bars having a central or intermediate portion of a specific cross section corresponding to the cross section of grooves 20, 22 and 24, respectively, such that the three bars are adapted to be seated in said respective grooves in a close fitting relationship therewith. Each of the three bars is provided with end portions of a different cross section from the cross section of the central portion. Bar 30 is provided with end portions 38 and 40 bracketing a central portion 36. Bar 32 is provided with end portions 44 and 46 bracketing a central portion 42. Bar 34 is provided with end portions 50 and 52 bracketing a central portion 48.

The length dimension of central portions 36, 42 and 48 are chosen to be equal to the length dimension of grooves, 20, 22 and 24 such that when seated in said grooves the end portions of the respective bars extend beyond transducer portion 14 and are seated on shoulders 16 and 18, respectively. As shown in FIGS. 1, 3 and 4 end portions 44 and 46 of bar 32 are provided with surfaces 54 on both sides of the end portions and an angled bottom surface 56 joining the extremities of tapered surfaces 54. Surface 56 is adapted to mate with and seat upon the corresponding angled surface which is created by the junction of shoulders 16 and 18. The sides of the end portions 38 and 40 of bar 30 and end portions 50 and 52 of bar 34 adjacent bar 32 are provided with tapered surfaces 58 and 60, respectively, which mate with and seat against surfaces 54 of bar 32 when the three bars are seated in the grooves 20, 22 and 24 respectively, providing an overlapping configuration of adjacent surfaces of bars 30 and 32 as well as bars 32 and 34. Apertures 62 and 64 are provided in the end portions of bars 30 and 34, respectively extending through the end portions to mating locations with tapped holes 66 provided in shoulders 16 and 18. Securing means 68, such as machine screws or bolts, are adapted to be advanced through apertures 62 and 64 into holes 66 to secure bars 30 and 32 to the body portion 12 and by the mating engagement of the end portions of said bars with bar 32 to lock bar 32 in position between said two bars.

A fully assembled head is shown in FIG. 2 and shown in ghosted relationship therewith is a magnetic tape 70 adapted to pass over the contoured transducer portion 14. In completing the securing operation bars 30, 32 and 34 are further secured in position in the grooves and on the shoulders of the head 10 by means of an epoxy adhesive applied to all of the mating surfaces thereof The final lapping and polishing operations are then performed on the assembled head to give transducer portion 14 the desired contour and that portion of the V bars above dotted line 72 (FIG. 1) is removed. This brings the top surfaces of bars 30, 32 and 34 into alignment with the top surfaces of ridges 26 and 28 and the elevated surface of portion 14.

In a conventional head assembly, transducing portion 14 is normally comprised of material such as an epoxy resin for potting the transducer assemblies which are located within the head assembly, except for the portion wherein the transducers extend up to and engage the magnetic tape engaging surface of the head. It has been found that in the course of using heads constructed of such a material, the movement of tape 70 over the contoured surface produces wear, eroding significant portions of the resin. By providing grooves as shown in FIG. 1 at 20, 22 and 24, those portions of the epoxy most subject to wear are removed and filled with wear-resistant bars of transducer body material. Substitution of bars of such material also act to restore the desired shape of the transducer magnetic core, a shape which would otherwise be altered by the grooving of portion 14.

In addition to securing the outside bars 30 and 34 as shown in FIGS. 1 and 2 by mechanical securing means, it is also contemplated that where magnetic considerations of the transducing head permit the V bar assembly can be an integral structure 76 (FIG. 5) or a middle bar 78 can be configured to secure two outside bars 80, 82 in position (FIG. 6). In FIG. 6 bolt holes 84 are provided in the end portions of bar 78 and the end portions of the overlapping surfaces adjusted such that the tapered surfaces 86 of end portions of bar 78 taper outwardly and the end portions of bars 80, 82 are provided with corresponding tapered surfaces 88 adjacent surfaces 78 to again provide mating surfaces between adjacent bars. In such an embodiment when bar 78 is secured to the body portion of the head, the mating surfaces of the end portion thereof will likewise serve to lock bars 80 and 82 into position without the necessity of providing securing means through the end portions thereof. As before, it is contemplated that all three bars will also be secured in position by an epoxy adhesive.

We claim:

1. A magnetic transducer comprising:

A body portion having one side adapted for the passage of a magnetic medium;

a first longitudinal surface on said passage side of the body portion;

a second longitudinal surface on said passage side of the body portion laterally displaced from the first surface;

a raised portion on said passage side of the body portion located between the first and second surfaces, said raised portion having a plurality of adjacent indentations extending thereacross in a direction transverse to the longitudinal dimension of the first and second surfaces;

a plurality of inserts, each having intermediate portions of cross section corresponding to the indentation cross sections fitting in said indentations and end portions extending beyond the raised portion and resting on the first and second surfaces, the end portions of at least two adjacent inserts having overlapping adjacent side surfaces; and means for securing one of said inserts to the body portion whereby the second insert is locked into position in its indentation.

2. A magnetic transducer according to claim 1 wherein the surface of the raised portion and the intermediate portions of the inserts fitting in the indentations form a continuous, smooth, arcuate surface adapted for travel of a magnetic medium.

3. A magnetic transducer according to claim 2 wherein the indentations provided across the raised portion are three parallel grooves having a V-shaped cross section and the inserts are three bars having a mating V V-shaped intermediate portion cross section.

4. A transducer according to claim 3 wherein the body portion of the transducer is fabricated of a material selected from the class consisting of stainless steel, brass, and aluminum and the bars are fabricated from the same material as the body portion.

5. A transducer according to claim 3 wherein the bars are adhesively secured to the grooves and the first and second longitudinal surfaces.

6. A transducer according to claim 4 wherein the bars are joined together to form an integral structure seated in the grooves of the transducer.

7. A transducer according to claim 3 wherein the end portion side surfaces of the first and third bars adjacent the second bar overlap the end portion side surfaces on both sides of the second bar.

8. A transducer according to claim 7 wherein the securing means pass through the end portions of the first and third bars and into the body portion of the transducer.

9. A transducer according to claim 3 wherein the end portion side surfaces of the second bar overlap the adjacent end portion side surfaces of the first and third bars.

10. A transducer according to claim 9 wherein the securing means pass through the end portions of the second bar and into the body portion of the transducer.

11. A magnetic transducer head comprising:

a block of body material;

a first longitudinal surface on one side of the block;

a second longitudinal surface on said side of the block laterally displaced from the first surface;

a raised head portion located on said block between the first and second surfaces having a surface to be positioned in operative relation with a magnetic medium;

first, second and third adjacent apertures extending across the head portion surface;

first, second and third elements, each element having an intermediate portion fitting in the first, second, and third apertures, respectively, and each having end portions extending from said intermediate portions resting on the first and second surfaces;

the end portions of the second element having side surfaces that taper inwardly from the first and second block surfaces;

the end portions of the first and third elements located on opposite sides of the second element having side surfaces adjacent the side surfaces of the second element provided with a mating taper to engage the second element end portion side surfaces; and means for physically connecting the outside elements to the block.

12. In a magnetic transducer head, a block of material having:

one side adapted for the passage of a magnetic medium:

a first longitudinal surface on said side of the block, the second surface being laterally displaced from the first surface; and a third surface on said side of the block, the third surface being located between the first and second surfaces and extending further from the block than the first and second surfaces, the improvement comprising:

first, second, and third adjacent V-shaped grooves extending across the third surface transverse in its length, a first bar having a V-shaped intermediate portion fitting in the first groove and end portions resting on the first and second surfaces, a second bar having an intermediate V-shaped portion fitting in the second groove and end portions resting on the first and second surfaces, a third bar having a V-shaped intermediate portion fitting in the third groove and end portions resting on the first and second surfaces, the ends of the second bar having sides that taper inwardly from the first and second surfaces, the ends of the first and third bars having sides adjacent the second bar that taper outwardly from the first and second surfaces to engage the sides of the end portions of the second bar, and securing means passing through the first and third bars and into the block for mechanically connecting said first and third bars to the block and locking said second bar in position between the first and third bars.

PO-1050
(5/69)

UNITED STATES PATENT OFFICE
CERTIFICATE OF CORRECTION

Patent No. 3,551,609 Dated February 3, 1971

Inventor(s) Cecil Winthrop Libby and Robert H. Sand

It is certified that error appears in the above-identified patent and that said Letters Patent are hereby corrected as shown below:

Column 1, line 56, delete the word "the";
line 59, delete the word "portion".
Column 2, line 47, "inter locking" should read --interlocking-
line 53, delete the word "embodiment" (first appeara
Column 3, line 44, after "thereof" insert a period (.).
Column 4, line 12, "A" (first appearance) should read --a--;
line 41, delete "V" (first appearance).
Column 5, line 20, delete the colon (:) after "medium" and insert a semicolon (;).
Column 6, line 4, delete "in" and insert --to--.

Signed and sealed this 13th day of April 1971.

(SEAL)
Attest:

EDWARD M.FLETCHER,JR.
Attesting Officer

WILLIAM E. SCHUYLER, JI
Commissioner of Patent